(12) United States Patent
Takahashi et al.

(10) Patent No.: US 6,489,469 B1
(45) Date of Patent: Dec. 3, 2002

(54) METHOD FOR STORING OR TRANSPORTING ERYTHRITOL SOLUTION

(75) Inventors: Chikanori Takahashi, Saitama (JP); Takashi Akasaka, Kawasaki (JP); Takanori Maehara, Gyoda (JP); Masatsugu Nozaki, Inashiki-gun (JP)

(73) Assignee: Nikken Chemicals Co., Ltd., Tokyo (JP)

( * ) Notice: Subject to any disclaimer, the term of this patent is extended or adjusted under 35 U.S.C. 154(b) by 0 days.

(21) Appl. No.: 09/936,707

(22) PCT Filed: Mar. 30, 2000

(86) PCT No.: PCT/JP00/02016

§ 371 (c)(1), (2), (4) Date: Sep. 14, 2001

(87) PCT Pub. No.: WO00/57723

PCT Pub. Date: Oct. 5, 2000

(30) Foreign Application Priority Data

Mar. 30, 1999 (JP) ............................................... 11-88184

(51) Int. Cl.⁷ .......................... C07G 17/00; C07H 1/00; C07H 3/00; C08B 37/00
(52) U.S. Cl. ........................ 536/124; 536/1.11; 536/4.1
(58) Field of Search ................................. 536/1.11, 4.1, 536/124

(56) References Cited

U.S. PATENT DOCUMENTS 4,886,677 A * 12/1989 Kondou ...................... 426/548

FOREIGN PATENT DOCUMENTS

| CA | 2029739 A | 5/1991 | |
| EP | 0 739 986 A | 10/1996 | |
| EP | 0 834 516 A | 4/1998 | |
| JP | 11-46701 | * 2/1999 | ............. A23L/1/09 |

* cited by examiner

*Primary Examiner*—James O. Wilson
*Assistant Examiner*—Patrick Lewis
(74) *Attorney, Agent, or Firm*—Frishauf, Holtz, Goodman & Chick, P.C.

(57) ABSTRACT

A method for the storage or transportation of an erythritol by maintaining erythritol in the form of a solution at a concentration and at a temperature in given ranges. Setting up such conditions enables long-term storage of an erythritol solution or transportation of erythritol to the destination in a state of a solution.

12 Claims, No Drawings

METHOD FOR STORING OR TRANSPORTING ERYTHRITOL SOLUTION

CROSS REFERENCE TO RELATED APPLICATION

This application is a U.S. national phase application under 35 USC 371 of International Application No. PCT/JP00/02016 filed Mar. 30, 2000.

TECHNICAL FIELD

The present invention relates to a method for the storage or transportation of an erythritol solution. More particularly, the present invention relates to a method for the storage or transportation of erythritol as food not in the form of crystal powder but of a solution with preventing contamination and deposition of crystals.

BACKGROUND ART

Erythritol is a sugar alcohol having 4 carbon atoms and is used widely in food industry as a sweetener having various characteristics such as a degree of sweetness of about 70% of that of sucrose, low energy property, and non-cariogenic property.

Conventionally, the storage (preservation) and transportation (distribution) of erythritol is practiced in a state where usually 20 kg of dry crystal powder as a unit is filled in a paper bag.

In recent years, erythritol has been put in use by beverage manufacturers and the demand therefor has been expanded remarkably. After purchase of erythritol, the beverage manufacturers as mass consumers open a large number of 20-kg bags one by one and throw the crystal into a solution tank to dissolve it before use. However, according as the consumption amount increases, there have arisen undesirable problems from the viewpoints of not only operation but also energy consumption and environmental protection. For example, labor and time required for opening the bags become overmuch. And since erythritol remarkably absorbs heat when it is dissolved, it is hard to dissolve, so that generally it is necessary to dissolve erythritol by stirring and heating with a considerable amount of dissolution energy (concretely with steam) with a use of a solution tank with a stirrer mounted. Furthermore, a considerable numbers of empty bags are treated as wastes.

The present inventors have made various studies in pursuit of erythritol product that is free of the above-mentioned defects. As a result they have found out that various problems on the storage, transportation or the like as described above can be overcome by maintaining erythritol in the form of a solution under given conditions. The present invention is based on this finding.

That is, the present inventors have made a study on the method for supplying erythritol to consumers by converting erythritol to a solution in a stage of shipment and storing or transporting it in the form of solution with studying conditions where no microorganism grow and the product will not deteriorate by coloring with heat or the like, more specifically storage temperature and erythritol concentration.

More specifically, they have studied on the conditions of storage temperature and concentration under which no microorganism will grow, conditions of storage temperature and concentration under which no erythritol crystal will precipitate and conditions of storage temperature under which no coloring of solution will proceed and studied the parameters that satisfy these three conditions.

As a result, they have found out parameters that satisfy them and created a method for the storage or transportation of erythritol in the form of a solution.

DISCLOSURE OF THE INVENTION

The present invention relates to a method for the storage or transportation of an erythritol solution comprising maintaining an erythritol solution under conditions of a solid content of 30% or more and a temperature of 50° C. or more, preferably a solid content of 50 to 70% and a temperature of 50 to 75° C., and more preferably a solid content of 50 to 58% and a temperature of 55 to 65° C., such that no erythritol crystal precipitates.

BEST MODE FOR CARRYING OUT THE INVENTION

Erythritol is produced by fermentation of glucose as a raw material using a microorganism having an erythritol producing ability. Erythritol in the fermentation liquid is then subjected to a purification process, more specifically the steps of cell separation, chromatographic separation, ion exchange resin treatment, activated carbon treatment, crystallization, crystal separation, and drying to produce a product of a crystal powder.

It is preferable that in the above process, the erythritol solution of the present invention is produced by concentrating the liquid being subjected to an activated carbon treatment before crystallization to a predetermined concentration, that is, a solid content of 30% or more, desirably from 50 to 70%, and more desirably from 50 to 58%.

The erythritol solution of the present invention may also be produced by adding water to the crystals after crystal separation to dissolve them to a predetermined concentration.

In the present invention, the erythritol solution prepared so as to have a predetermined concentration is maintained at a temperature that does not cause crystal precipitation, can prevent the growth of microorganism and causes no deterioration of product due to coloring, i.e., about 50° C. or more, usually from 50 to 75° C., preferably from 55 to 65° C.

The present invention is a method for the storage or transportation of an erythritol solution comprising maintaining the erythritol solution at a concentration and a temperature within given ranges. Setting up such conditions enables long-term storage of an erythritol solution and transportation of erythritol to the destination in the form of a solution.

The erythritol solution is poured in a tank, for example a tank trailer or a freight car, and is stored or transported to the destination by means of keeping warm if necessary so as to prevent the precipitation of crystal.

Hereinafter, the method for the storage or transportation of an erythritol solution of the present invention will be described by examples. However, the present invention should not be limited thereto.

EXAMPLE 1
(Resistance to Various Saprophytic Microorganisms)

Erythritol solutions of respective concentrations in the range of from 30 to 60% were prepared. To these were inoculated *Staphylococcus aureus* IFO 13276, *Bacillus subtilis* IFO 3134, and *Escherichia coli* IFO 3972 as bacteria, *Candida albicans* IFO 1549 and *Saccharomyces cerevisiae* ATCC 9763 as yeasts, *Aspergillus niger* IFO 6342, *Aspergil-* lus flavus IFO 6343, and *Penicillium funiculosum* IFO 6345 as fungi, respectively, in a population (concentration) of 10,000 cells/mL or more.

After the inoculation, the solutions were stored at 30, 37, 45, 50, or 60° C., respectively, for 56 days and the number of viable cell was determined daily. The determination of the number of viable cell was performed by a method of coating 0.1 mL of appropriately diluted sample cultivation on an agar plate and cultivating and counting the number of viable cell (the number of colony) that grew after the cultivation. The results are shown in Tables 1 to 8.

As will be apparent from the tables, all the microbes were prevented from growing at a temperature of 50° C. or more. Other microbes than *Aspergillus niger* died after 3 days. Also *Aspergillus niger* died after 7 days.

From this it can be seen that charging an erythritol solution in a concentration of 30% (w/w) or more in a container such as a tank trailer and maintaining the temperature at 50° C. or more enable storage or transportation of the erythritol solution with preventing the growth of ordinary bacteria and causing no precipitation of crystals.

TABLE 1

Viable Count of *Staphylococcus aureus* IFO 13276 in Erythritol Solution

| Temperature (° C.) | Concentration (%/w/w) | The Number of Viable Cell (cells/mL) | | | | | |
|---|---|---|---|---|---|---|---|
| | | Day 0 | Day 3 | Day 7 | Day 14 | Day 28 | Day 56 |
| 30 | 30 | 10000 or more | 20400 | 11100 | 360 | 0 | 0 |
| | 40 | 10000 or more | 8380 | 6200 | 4200 | 0 | 0 |
| 45 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |
| 50 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |

TABLE 2

Viable Count of *Escherichia coli* IFO 3972 in Erythritol Solution

| Temperature (° C.) | Concentration (%/w/w) | The Number of Viable Cell (cells/mL) | | | | | |
|---|---|---|---|---|---|---|---|
| | | Day 0 | Day 3 | Day 7 | Day 14 | Day 28 | Day 56 |
| 30 | 30 | 10000 or more | 10000 or more | 10000 or more | 7780 | 110 | 0 |
| | 40 | 10000 or more | 10400 | 2820 | 420 | 0 | 0 |
| 37 | 30 | 10000 or more | 10000 or more | 8270 | 0 | 0 | 0 |
| | 40 | 10000 or more | 11100 | 140 | 0 | 0 | 0 |
| 45 | 30 | 10000 or more | 450 | 0 | 0 | 0 | 0 |
| | 40 | 10000 or more | 0 | 0 | 0 | 0 | 0 |
| | 50 | 10000 or more | 0 | 0 | 0 | 0 | 0 |
| 50 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |

TABLE 3

Viable Count of *Bacillus subtilis* IFO 3134 in Erythritol Solution

| Temperature (° C.) | Concentration (%/w/w) | The Number of Viable Cell (cells/mL) | | | | | |
|---|---|---|---|---|---|---|---|
| | | Day 0 | Day 3 | Day 7 | Day 14 | Day 28 | Day 56 |
| 30 | 30 | 10000 or more | 2980 | 440 | 110 | 750 | 0 |
| | 40 | 10000 or more | 300 | 0 | 20 | 0 | 0 |
| 37 | 30 | 10000 or more | 170 | 11500 | — | 1000 | 0 |
| | 40 | 10000 or more | 0 | 0 | 0 | 0 | 0 |
| 45 | 30 | 10000 or more | — | 110 | 0 | 0 | 0 |
| | 50 | 10000 or more | 30 | 0 | 0 | 0 | 0 |
| 50 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |

TABLE 4

Viable Count of *Candida albicans* IFO 1549 in Erythritol Solution

| Temperature | Concentration | The Number of Viable Cell (cells/mL) | | | | | |
|---|---|---|---|---|---|---|---|
| (° C.) | (%/w/w) | Day 0 | Day 3 | Day 7 | Day 14 | Day 28 | Day 56 |
| 37 | 30 | 10000 or more | 10000 or more | 10000 or more | 10000 or more | 10000 or more | 10000 or more |
|  | 40 | 10000 or more | 10000 or more | 10000 or more | 10000 or more | 10000 or more | 10000 or more |
| 45 | 30 | 10000 or more | 190 | 0 | 0 | 0 | 0 |
|  | 40 | 10000 or more | 0 | 0 | 0 | 0 | 0 |
|  | 50 | 10000 or more | 0 | 0 | 0 | 0 | 0 |
| 50 | 30 | 10000 or more | 0 | 0 | 0 | 0 | 0 |
|  | 40 | 10000 or more | 0 | 0 | 0 | 0 | 0 |
|  | 50 | 10000 or more | 0 | 0 | 0 | 0 | 0 |

TABLE 5

Viable Count of *Saccharomyces cerevisiae* ATCC 9763 in Erythritol Solution

| Temperature | Concentration | The Number of Viable Cell (cells/mL) | | | | | |
|---|---|---|---|---|---|---|---|
| (° C.) | (%/w/w) | Day 0 | Day 3 | Day 7 | Day 14 | Day 28 | Day 56 |
| 37 | 30 | 10000 or more | 10000 or more | 10000 or more | 10000 or more | 10000 or more | 0 |
|  | 40 | 10000 or more | 10000 or more | 10000 or more | 10000 or more | 1130 | 0 |
| 45 | 30 | 10000 or more | 1480 | 0 | 0 | 0 | 0 |
|  | 40 | 10000 or more | 1440 | 0 | 0 | 0 | 0 |
|  | 50 | 10000 or more | 1600 | 0 | 0 | 0 | 0 |
| 50 | 30 | 10000 or more | 0 | 0 | 0 | 0 | 0 |
|  | 40 | 10000 or more | 0 | 0 | 0 | 0 | 0 |
|  | 50 | 10000 or more | 0 | 0 | 0 | 0 | 0 |

TABLE 6

Viable Count of *Aspergillus niger* IFO 6342 in Erythritol Solution

| Temperature | Concentration | The Number of Viable Cell (cells/mL) | | | | | |
|---|---|---|---|---|---|---|---|
| (° C.) | (%/w/w) | Day 0 | Day 3 | Day 7 | Day 14 | Day 28 | Day 56 |
| 45 | 30 | 10000 or more | 10000 or more | 10000 or more | 10000 or more | 10000 or more | 0 |
|  | 40 | 10000 or more | 10000 or more | 10000 or more | 10000 or more | 0 | 0 |
|  | 50 | 10000 or more | 10000 or more | 10000 or more | 10000 or more | 0 | 0 |
| 50 | 30 | 10000 or more | 0 | 0 | 0 | 0 | 0 |
|  | 40 | 10000 or more | 10000 or more | 0 | 0 | 0 | 0 |
|  | 50 | 10000 or more | 10000 or more | 0 | 0 | 0 | 0 |
| 60 | 30 | 10000 or more | 0 | 0 | 0 | 0 | 0 |
|  | 40 | 10000 or more | 0 | 0 | 0 | 0 | 0 |
|  | 50 | 10000 or more | 0 | 0 | 0 | 0 | 0 |

TABLE 6-continued

Viable Count of *Aspergillus niger* IFO 6342 in Erythritol Solution

| Temperature | Concentration | The Number of Viable Cell (cells/mL) | | | | | |
|---|---|---|---|---|---|---|---|
| (° C.) | (%/w/w) | Day 0 | Day 3 | Day 7 | Day 14 | Day 28 | Day 56 |
| | 60 | 10000 or more | 0 | 0 | 0 | 0 | 0 |

TABLE 7

Viable Count of *Aspergillus flavus* IFO 6343 in Erythritol Solution

| Temperature | Concentration | The Number of Viable cell (cells/mL) | | | | | |
|---|---|---|---|---|---|---|---|
| (° C.) | (%/w/w) | Day 0 | Day 3 | Day 7 | Day 14 | Day 28 | Day 56 |
| 45 | 30 | 10000 or more | 10000 or more | 10000 or more | 10000 or more | 0 | 0 |
| | 40 | 10000 or more | 10000 or more | 10000 or more | 10000 or more | 0 | 0 |
| | 50 | 10000 or more | 10000 or more | 10000 or more | 0 | 0 | 0 |
| 50 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |

TABLE 8

Viable Count of *Penicillium funiculosum* IFO 6345 in Erythritol Solution

| Temperature | Concentration | The Number of Viable Cell (cells/mL) | | | | | |
|---|---|---|---|---|---|---|---|
| (° C.) | (%/w/w) | Day 0 | Day 3 | Day 7 | Day 14 | Day 28 | Day 56 |
| 37 | 30 | 10000 or more | 10000 or more | 10000 or more | 10000 or more | 10000 or more | 10000 or more |
| | 40 | 10000 or more | 10000 or more | 10000 or more | 10000 or more | 10000 or more | 10000 or more |
| 45 | 30 | 10000 or more | 370 | 0 | 0 | 0 | 0 |
| | 40 | 10000 or more | 750 | 0 | 0 | 0 | 0 |
| | 50 | 10000 or more | 1260 | 0 | 0 | 0 | 0 |
| 50 | 30 | 10000 or more | 0 | 0 | 0 | 0 | 0 |
| | 40 | 10000 or more | 0 | 0 | 0 | 0 | 0 |
| | 50 | 10000 or more | 0 | 0 | 0 | 0 | 0 |

EXAMPLE 2

(Resistance to Heat Resistant Bacteria)

Erythritol solutions of respective concentrations in the range of from 30 to 70% were prepared. To these was inoculated *Bacillus stearothermophilus* IFO 12550 as a heat resistant bacterium in a population (concentration) of 10,000 cells/mL or more.

After the inoculation, the solutions were stored at 50, 60 or 75° C., respectively, for 56 days and the number of viable cell was determined daily. The determination of the number of viable cell was performed by in the same manner as in Example 1. The results are shown in Table 9.

As will be apparent from the table, also in the case of the heat resistant bacteria, in all the concentrations the growth of the bacteria was inhibited at a temperature of 50° C. or more. At 75° C., all the cells died after 14 days.

From this it can be seen that charging an erythritol solution in a concentration of 30% or more in a container such as a tank trailer and maintaining the temperature at 50° C. or more enable storage or transportation of the erythritol solution with preventing the growth of heat resistant bacteria.

TABLE 9

Viable Count of *Bacillus stearothermophilus* IFO 12550 in Erythritol Solution

| Temperature (° C.) | Concentration (%/w/w) | The Number of Viable Cell (cells/mL) | | | | |
|---|---|---|---|---|---|---|
| | | Day 0 | Day 3 | Day 7 | Day 14 | Day 28 | Day 56 |
| 50 | 30 | 10000 or more | 70 | 60 | 40 | 60 | 50 |
| | 40 | 10000 or more | 40 | 50 | 50 | 50 | 60 |
| | 50 | 10000 or more | 100 | 100 | 50 | 70 | 120 |
| 60 | 30 | 10000 or more | 90 | 60 | 90 | 300 | 0 |
| | 40 | 10000 or more | 60 | 70 | 200 | 320 | 0 |
| | 50 | 10000 or more | 100 | 150 | 200 | 330 | 0 |
| | 60 | 10000 or more | 130 | 100 | 150 | 120 | 0 |
| 75 | 30 | 10000 or more | 350 | 340 | 0 | 0 | 0 |
| | 40 | 10000 or more | 330 | 490 | 0 | 0 | 0 |
| | 50 | 10000 or more | 220 | 590 | 0 | 0 | 0 |
| | 60 | 10000 or more | 170 | 480 | 0 | 0 | 0 |
| | 70 | 10000 or more | 140 | 210 | 0 | 0 | 0 |

EXAMPLE 3

(Long-term Stability of Erythritol Solution by High Temperature Storage)

solutions having erythritol concentrations of 50%, 55%, 58% and 62%, respectively, were prepared and stored at 55° C., 60° C., 65° C. and 75° C. respectively, for 2 months and degree of coloring, pH, and purity were measured and the degree of deterioration was studied. The results are shown in Tables 10 to 13.

As a result, it revealed that storage at a temperature of 55 to 65° C. enabled storage without causing a decrease in purity or causing coloring. Also, in a short period of 10 days or less, the change in pH was 1 or less and the change in the degree of coloring was 0.01 less even at 75° C., with causing no change in purity so that storage was possible without any problem.

TABLE 10

Relationship of Storage Temperature with Degree of Coloring, pH:, and Purity (%)
Storage Temperature: 75° C., Erythritol Concentration: 62%

| Number of Days | Degree of Coloring | pH | Purity (%) |
|---|---|---|---|
| 0 | 0.025 | 5.7 | 99.9 |
| 10 | 0.027 | 5.2 | 99.9 |
| 30 | 0.033 | 4.8 | 99.9 |
| 60 | 0.065 | 3.9 | 99.9 |

TABLE 11

Relationship of Storage Temperature with Degree of Coloring, pH:, and Purity (%)
Storage Temperature: 65° C., Erythritol Concentration: 58%

| Number of Days | Degree of Coloring | pH | Purity (%) |
|---|---|---|---|
| 0 | 0.029 | 5.7 | 100.0 |
| 10 | 0.030 | 5.5 | 99.9 |
| 30 | 0.029 | 5.2 | 100.0 |
| 60 | 0.036 | 4.7 | 99.9 |

TABLE 12

Relationship of Storage Temperature with Degree of Coloring, pH:, and Purity (%)
Storage Temperature: 60° C., Erythritol Concentration: 55%

| Number of Days | Degree of Coloring | pH | Purity (%) |
|---|---|---|---|
| 0 | 0.021 | 5.7 | 99.9 |
| 10 | 0.021 | 5.4 | 99.9 |
| 30 | 0.023 | 5.5 | 99.9 |
| 60 | 0.028 | 5.0 | 99.9 |

TABLE 13

Relationship of Storage Temperature with Degree of Coloring, pH:, and Purity (%)
Storage Temperature: 55° C., Erythritol Concentration: 50%

| Number of Days | Degree of Coloring | pH | Purity (%) |
|---|---|---|---|
| 0 | 0.028 | 5.7 | 99.9 |
| 10 | 0.028 | 5.6 | 99.9 |
| 30 | 0.026 | 5.4 | 100.0 |
| 60 | 0.027 | 5.1 | 100.0 |

From the above results, it revealed that in order to store or transport erythritol solution in a stable state by increasing amount of erythritol to be stored or transported and further preventing the precipitation of crystals from the erythritol solution, it is advantageous that the concentration is set to 50% or more and the temperature is maintained at from 50 to 75° C., preferably from 55 to 65° C.

INDUSTRIAL APPLICABILITY

In the present invention, erythritol is converted into a high concentration solution as high as 30% or more in contrast to conventional crystal powder so that erythritol can be stored or transported while warming it. As a result, mass consumers can save the burden in opening bags and dissolution of erythritol, a large amount of dissolution energy and expenses for installation such as a dissolution tank with a stirrer, which have been conventional problems, and furthermore can solve the problem of environmental pollution accompanying the disposal treatment of empty bags.

What is claimed is:

1. A method for the storage or transportation of an erythritol solution, comprising maintaining for at least three days an erythritol solution-consisting essentially of water and erythritol under conditions of a concentration of erythritol of 50 to 70%/w/w and a temperature of 50 to 75° C. such that no erythritol crystal precipitates.

2. A method for the storage or transportation of an erythritol solution, comprising maintaining for at least three days an erythritol solution consisting essentially of water and erythritol under conditions of a concentration of erythritol of 50 to 58%/w/w and a temperature of 55 to 65° C.

3. The method of claim 1, wherein the solution does not discolor.

4. The method of claim 2, wherein the solution does not discolor.

5. The method of claim 1, wherein no microorganism grows in the solution.

6. The method of claim 2, wherein no microorganism grows in the solution.

7. The method of claim 3, wherein no microorganism grows in the solution.

8. The method of claim 4, wherein no microorganism grows in the solution.

9. The method of claim 2, wherein no erythritol crystal precipitates.

10. The method of claim 4, wherein no erythritol crystal precipitates.

11. The method of claim 6, wherein no erythritol crystal precipitates.

12. The method of claim 8, wherein no erythritol crystal precipitates.

* * * * *